July 24, 1956 W. E. NOLD ET AL 2,756,383
MAGNETOMETER PROBE
Filed Jan. 26, 1953
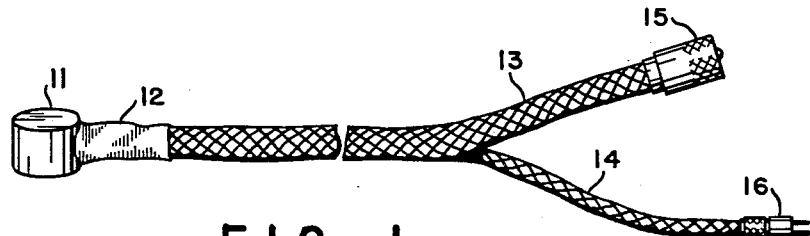
FIG. 1
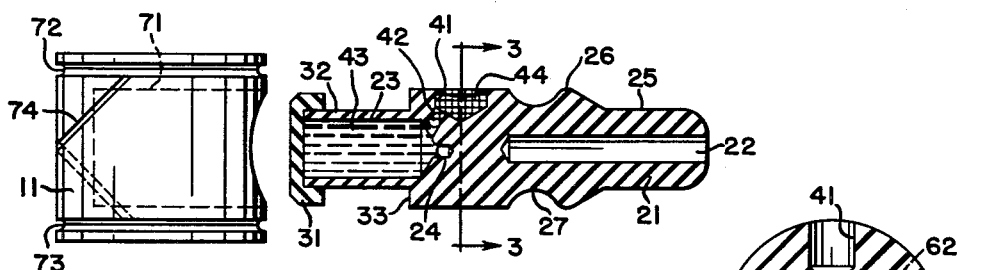
FIG. 2
FIG. 3
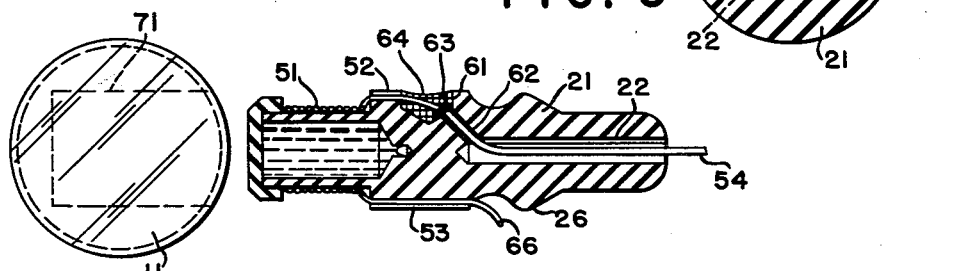
FIG. 4
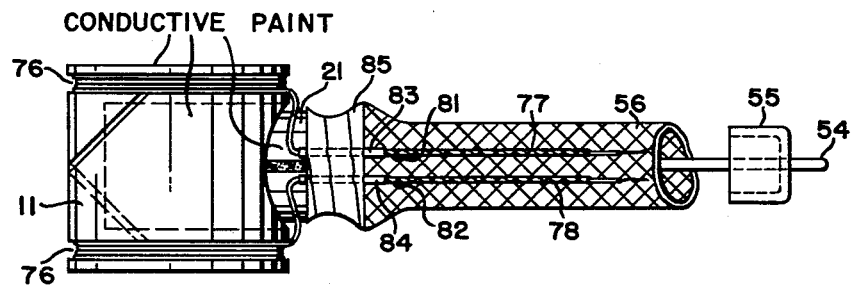
FIG. 5
INVENTORS
WALTER E. NOLD
A. CARL WESTBOM Jr.
BY Joseph Weingarten
ATTORNEY

United States Patent Office 2,756,383
Patented July 24, 1956

2,756,383

MAGNETOMETER PROBE

Walter E. Nold, Natick, and Albin Carl Westbom, Jr., Westwood, Mass., assignors, by mesne assignments, to Nuclear Magnetics Corporation, Boston, Mass., a corporation of Delaware Application January 26, 1953, Serial No. 333,059

17 Claims. (Cl. 324—.5)

The present invention relates in general to the measurement of magnetic fields and more particularly concerns a novel probe structure for association with nuclear resonance magnetometers.

The investigation of magnetic fields with apparatus utilizing the principles of nuclear resonance is a comparatively recent concept. Basically, a magnetometer operative upon these principles translates the problem of field measurement to the measurement of an electrical signal frequency, the latter of which, with available precision test equipment, is capable of determination with accuracy of exceptional degree.

The fundamental phenomenon which renders this technique available is the precession of the nuclei of a sample of matter placed in a magnetic field about their axes at a frequency directly proportional to the field strength and inversely proportional to the gyromagnetic ratio of the nuclei, the latter being a determinable constant for the test sample. Explanation of this effect is relatively involved and intimately related to modern physical theories. Since the present invention is not concerned chiefly with the broad aspects of this phenomenon, but rather with the novel structure of a component of a flux measuring instrument based thereon, no effort will be made here to present a detailed theoretical analysis of the principles of nuclear resonance. However, for reference purposes, the following papers available in the technical literature will be found quite informative:

Resonance Absorption by Nuclear Magnetic Moments in a Solid; Purcell, Torrey, and Pound; Physical Review, vol. 69, Nos. 1 and 2, January 1 and 15, 1946.

Nuclear Magnetic Resonance Absorption in Hydrogen Gas; Purcell, Pound, and Bloembergen; Physical Review, vol. 70, Nos. 11 and 12, December 1 and 15, 1946.

A Radiofrequency Spectrometer for the Detection of Resonance Absorption by Nuclear Moments; Pound; Physical Review, vol. 72, No. 6, September 15, 1947.

Relaxation Effects in Nuclear Magnetic Resonance Absorption; Bloembergen, Purcell, and Pound; Physical Review, vol. 73, No. 7, April 1, 1948.

A Radiofrequency Spectrograph and Simple Magnetic Field Meter; Pound and Knight; Review of Scientific Instruments, vol. 21, No. 3, March, 1950.

Observation of the gyromagnetic properties of nuclei is made possible by placing the sample in a homogeneous magnetic field and surrounding this sample with a coil, which in turn comprises the inductive element of a radio frequency oscillator tank circuit. When the precession frequency of the sample nuclei coincides with the frequency of oscillation, the sample will absorb energy from the oscillating field within the coil, which in effect is apparent as reduction in coil Q, with the ultimate result that the level of signal oscillation will experience a corresponding reduction.

In a nuclear resonance magnetometer, means are provided for adjusting the oscillator frequency and for detecting the dip in radio frequency output level. The oscillator adjustment may be calibrated directly in terms of magnetic field strength in view of the direct proportionality noted above, or in frequency and a simple computation made to translate frequency to gauss.

The nuclear resonance effect, though precisely related to magnetic field strength, is relatively small. That is, the energy absorption at resonance does not change the coil Q substantially and accordingly sensitive means must be provided to display the coincidence of oscillator frequency and that of nuclei precession. In one form of magnetometer, the oscillator output signal after passage through a buffer stage is detected and amplified by an audio amplifier. The audio amplifier output is coupled to the vertical deflection terminals of a cathode ray oscilloscope. To render the resonance effect visible on the screen, it is found desirable to modulate the direct magnetic field to be measured, and for this purpose, an auxiliary coil lying in a plane normal to the axis of the field under test is placed in the vicinity of the sample and its associated oscillator coil. A low frequency modulating signal applied to the auxiliary coil cyclically varies the field about its direct value, and as a consequence, the frequency of nuclear resonance is correspondingly swept through a small range. By sweeping the oscilloscope beam horizontally and in synchronism with the modulating signal, a dip will be evident if the oscillator frequency is set for resonance within the variation of the field created by the modulating signal. If the beam sweep and the modulating signal are properly phased, adjustment of the oscillator frequency to present the absorption dip at the sweep center is all that is needed to determine the resonance frequency, and hence, the associated magnetic field strength.

The design considerations of the magnetometer adjustable oscillator, modulating signal source, detector and oscilloscope display are not in and of themselves essential to an understanding of this invention. The brief functional description of a magnetometer above has been presented to indicate the nature of the apparatus with which the test probe is associated.

The present invention contemplates and has as a primary object the provision of a highly sensitive and compact nuclear resonance magnetometer test probe permitting the critical exporation and study of unknown magnetic fields. Basically, the test probe herein disclosed contains a sample of matter exhibiting relatively pronounced, known gyromagnetic properties in association with an oscillator tank coil and a field modulating coil for purposes as noted above. Probe construction is such that the field under study is undisturbed magnetically during use, and probe size is held to a minimum thereby permitting application to relatively small fields.

In one specific aspect of this invention, the test probe is formed of two cylindrical, non-magnetic members having perpendicularly intersecting axes. The first of these includes a sample chamber adapted for ready filling without contamination, and for dependable hermetic sealing.

Means are provided on this first member for supporting a radio frequency coil in proximate relation with the sample and for coupling this coil back to an oscillator tank circuit without undue leakage or other losses. The second member is arranged substantially to enclose the first and to support a Helmholtz coil symmetrically about the region of the oscillator coil and matter sample. Complete electrostatic shielding is provided for both coils and the sample, and flexible conductors permit coupling to the remote magnetometer.

It is accordingly another object of the present invention to provide a nuclear resonance magnetometer test probe capable of reliably sampling fields under test and adapted for manufacture on a production basis at moderate cost. A further object is to provide such a magnetometer test probe wherein with a fixed configuration and size and with predetermined sample of matter, an extensive range of magnetic field values may be covered simply by changing the inductance of the oscillator tank coil.

These and other objects of the present invention will now become apparent from the following detailed specification when taken in connection with the accompanying drawing in which:

Fig. 1 is a general perspective view of the assembled magnetometer test probe ready for connection to a nuclear resonance magnetometer;

Fig. 2 is a front elevation of several cooperating components of the magnetometer test probe shown in Fig. 1;

Fig. 3 is a cross-sectional view of the magnetometer probe body taken along the line 3—3 of Fig. 2 and enlarged in scale for additional clarity;

Fig. 4 is a plan view of the magnetometer probe elements illustrated in Fig. 2 with the addition of the oscillator coil and certain connections thereto; and Fig. 5 is a front elevational view of a magnetometer test probe just prior to final assembly.

With reference now to the drawing, and more particularly to Fig. 1 thereof, there is illustrated in pictorial fashion, the novel test probe ready for connection to and use in association with a nuclear resonance magnetometer. Generally speaking, the test probe is formed with a substantially cylindrical head 11 and a body portion extending therefrom covered by protective insulating sleeving 12, and flexible electrical cables 13 and 14 covered with a common cotton braid, except at the right-hand ends thereof, which terminate in electrical plug-in connectors 15 and 16, respectively. To assist the visualization of a probe in use, it might be mentioned that the head 11 in an actual unit is of the order of three-fourths inch in diameter and five-eighths inch in axial length. As will become more apparent from the discussion which follows, cable 13 is of bead dielectric, coaxial conductor construction and couples the radio frequency coil within the magnetometer probe through coaxial connector 15 to the magnetometer oscillator. Cable 14 is used to link a Helmholtz coil within head 11 to a modulating signal source through connector 16.

The general functions of the nuclear resonance magnetometer itself have been briefly noted above. Since the present invention relates primarily to the probe structure, details of the magnetometer itself are not shown in the drawing.

Reference is now made to Figs. 2 to 4 inclusive for a discussion of the structural features of the principal elements of the test probe; namely, probe head 11 and probe body 21. Both of these components may be formed either by individual machining operations or by suitable molding processes of chemically inert, non-magnetic, plastic substance.

The body structure 21 of the magnetometer probe is arranged to contain the sample of matter whose gyromagnetic properties have been predetermined and to support a coil forming the inductive element of the tank circuit of the magnetometer variable frequency oscillator in close physical relation to the sample. Body 21 is of generally cylindrical shape having a central portion of maximum diameter, and reduced diameter ends, and formed with three axial openings 22, 23, and 24, the functions of which will be clearly set forth below. In the end region 25 of reduced diameter, which may be referred to as the cable end, an annular protrusion or bulge 26 and an annular groove 27 provide the desired shape. At the opposite end, which may be designated as the sample end of body 21, chamber 23 is terminated with a saucer-shaped cap 31 affixed preferably with a resinous cement providing a liquid-tight, hermetic seal. The outer diameter of cap 31 is substantially equal to the diameter of the central region of body 21. It is thus evident that the cylindrical surface 32 between cap 31 and shoulder 33 conveniently affords a form for winding and supporting an oscillator coil.

As shown most clearly in Figs. 2 and 3, a shallow perpendicular bore 41 is provided in the central portion of body 21 and a relatively small fill hole 42 is drilled angularly to provide a passage communicating with chamber 23.

In fabricating the magnetometer test probe with the body held horizontally, a hypodermic syringe having a fine-gauge needle is inserted through openings 41 and 42 and into chamber 23. Fluid sample 43 of known gyromagnetic properties is carefully and slowly injected so that chamber 23 is filled entirely, with the exception that an air bubble is intentionally entrapped in the relatively small axial cavity 24. With the liquid in place, a suitable resinous cement 44 is used to fill openings 41 and 42, whereby sample 43 is hermetically sealed and free from contamination. The small bubble trapped by cavity 24 remains within the sealed off portion to accommodate expansion and contraction of the solution under varying temperature conditions in use.

Radio frequency oscillator coil 51 is wound of fine wire upon surface 32 over the liquid sample 43. The precise nature of coil 51 will, of course, be dependent upon the range of frequencies to be covered by the particular probe. A single-layer coil, as shown, or a multi-layer coil of lesser axial length may be positioned over the sample.

A pair of diametrically opposed longitudinal grooves 52 and 53, illustrated plainly in Figs. 3 and 4, are provided in the central portion of body 21 for recessing the ends of radio frequency coil 51. To connect coil 51 to the magnetometer, coaxial cable 13, shown in Figs. 1 and 5, is used. The specific type of cable employed will, of course, be dependent upon the operating frequency; but it has been found preferable for minimum electrical loss with maximum flexibility, to employ, as noted above, a beaded coaxial cable having an inner conductor 54, a plurality of uniformly axially spaced cup-shaped dielectric beads 55, and a metallic braid for outer cylindrical conductor 56. It should be noted that the diameters of beads 55 and the cable end of the probe body are alike.

Fig. 4 illustrates the manner in which the inner conductor 54 of coaxial cable 13 is joined to one end of coil 51. Specifically, a second shallow bore 61, at right angles to bore 41, is provided in the central portion of body 21, and a small angularly set opening 62 is drilled to provide passage to opening 22. Inner conductor 54 of the coaxial cable is fed through opening 22 and through passage 62 and a solder bead 63 used to connect to the end of coil 51. Before the inner conductor 54 is pulled taut with solder bead 63 closing passage 62, as shown, a quantity of resinous cement 64 is inserted in opening 61 to provide a dependable and permanent seal.

As best illustrated in Fig. 5, the metallic cable braid 56 is flared and fitted smoothly over annular bulge 26. The free end 66 of coil 51, shown in Fig. 4, is securely soldered to the end of conductive braid 56 and a number of turns of fine uninsulated wire, not shown, are wound tightly around and soldered to the braid in the annular depression 27 thereby substantially permanently fastening cable 13 to the probe body. Grooves 52 and 53 are loaded with cement to provide, when dry, a smooth cylindrical outer surface.

Probe head 11 is preferably, as noted above, a cylindrical plastic member having a cylindrical, transverse opening 71 formed therein substantially equal to the probe body diameter. A pair of annular grooves 72 and 73 are cut at the outer edges of the cylindrical head and are interconnected by a small spiral groove 74.

In assembling the probe, head 11 is fitted over and cemented to body 21 in the position shown in Fig. 5. The cement is applied so that a hermetic seal is obtained to prevent moisture penetration into the region of the coil and sample. Thereafter, a uniform coating of conductive paint is applied over the entire exposed surface of head 11 and body 21, contact being made with the fastened end of braid 56. Thus, there is provided an electrostatic shield for the liquid sample and the oscillator coil. When the coaxial cable braid is grounded at the magnetometer, the conductive paint will be at ground potential.

A Helmholtz coil 76 formed of a single insulated conductor is wound in the two interconnected grooves 72 and 73. As is well understood, the magnetic field established by a coil of this type is extremely uniform throughout a comparatively extensive volume of space in the central region between the coils. When assembled, coil 51 and sample 43 are centrally and symmetrically positioned within the Helmholtz coil.

A pair of relatively fine shielded conductors 77 and 78 are placed against the conductive braid 56 and the braids soldered together at 81 and 82, respectively. At the left-hand ends of cables 77 and 78, the braid is removed, the inner conductors thereof soldered to the ends of Helmholtz coil 76, and insulating sleeves 83 and 84 slipped over the junctions. Thereafter, a number of turns of insulating tape 85 are securely wrapped around the braid 56 and sleeves 83 and 84 in the region of the annular groove 27.

As shown in Fig. 1, a protective sleeve 12 is used to finish and enclose the probe body in the region of its junction with probe head 11. The grooves over the Helmholtz coil are filled with cement and the probe head is laquered to protect the electrostatic shield thereon. Also, in finishing, the probe conductors 77 and 78 are wrapped under a common cotton braid to form the cable section 14 extending to connector 16.

In use, the probe is inserted into the magnetic field being measured so that the field vector is substantially parallel to the axis of probe head 11. In this manner, a low frequency alternating current in the Helmholtz coil will modulate the unidirectional magnetic field in the region of oscillator coil 51 and sample 43.

The particular liquid used for filling the probe chamber will be a function of the nature of the fields to be measured. As a representative example, two responsive nuclei sources may be included by using a saturated water solution of lithium chloride. The proton, nucleus of hydrogen and abundant in the water, gives a very sharp, intense response at resonance. Observation of proton resonance may be facilitated by use of paramagnetic ions, as by adding manganese chloride to the lithium solution. Lithium nuclei precess with less intensity at lower frequency. Proton resonance is normally used for measurement; but by the provision of two responsive nuclei, the range of the instrument may be extended. For protons, the relationship between frequency and field is 4257.76±0.10 cycles per gauss. When lithium resonance is employed, the frequency to field ratio is 1654.61±0.10 cycles per gauss.

A practical limitation on the use of the magnetometer test probe is the range of frequency over which the coil 51 surrounding the liquid sample may be tuned using a variable capacitor in the oscillator. In association with one magnetometer it has been found that by dividing a frequency range of 1.18 to 34.0 megacycles per second among four probes, a range of field strength measurements is made available from approximately 300 to 8000 gauss for proton resonance and from approximately 700 to 20,000 gauss for lithium resonance. In operation during such measurements, the Helmholtz coil current is controlled to modulate the field adjustably between 1.6 to 16 gauss.

It has been noted above that the energy absorption by the sample at nuclear resonance is relatively slight and that sensitive means must be employed to detect this phenomenon. To obtain maximum absorption, it has been found that the liquid should be coupled electromagnetically as tightly as possible with the oscillator coil 51 in the probe. As a design consideration, then, the body wall thickness in the region of sample chamber 23 should be as small as possible, consistent with the required overall physical strength of the probe. To a certain extent, therefore, the thickness of this wall, as shown in the drawings, has been exaggerated for clarity.

The probe shown in the drawing, when associated with a magnetometer, has numerous applications in research, instruction and control. By virtue of the compact arrangement, a small sampling volume is obtained, and, with the probe shown, fields of limited area may be thoroughly investigated, despite the fact that a large degree of field homogeneity in the sample region is needed for a sharply visible resonance dip.

By introducing different substances into the bore 23, the chemical properties may be investigated by analysis of their gyromagnetic characteristics. In fact, it is possible to perform a large number of qualitative and quantitative analyses of chemical compounds using a probe of the type herein described in association with a magnet of known field strength and a resonance detecting circuit.

In view of the comparatively recent advent of this field of science, many other uses for the present invention may, of course, be found. Since numerous modifications and departures of the disclosure herein may now be made by those skilled in this art, the invention herein is to be construed as limited only by the spirit and scope of the appended claims.

What is claimed is:

1. A magnetometer test probe comprising, a substantially cylindrical body portion adapted for attachment to a coaxial cable, a sample chamber in said body portion, a relatively high frequency coil disposed on said body portion in close association with said sample chamber, and low frequency electromagnetic means affixed to said body portion for establishing when energized a relatively low frequency alternating magnetic field substantially uniformly throughout the region occupied by said high frequency coil and said sample chamber.

2. A magnetometer test probe comprising, a substantially cylindrical body portion having axially formed openings therein, one of said openings being adapted to receive a liquid sample of predetermined gyromagnetic properties and another thereof to axially support an electrical conductor, said body portion having a reduced diameter substantially cylindrical surface over said sample opening, a radio frequency coil positioned on said reduced diameter surface, and a low frequency electromagnetic coil means affixed to said body portion for establishing when energized, a low frequency alternating magnetic field uniformly throughout said body portion of reduced diameter.

3. A magnetometer test probe comprising, a substantially cylindrical non-magnetic body portion having an axially formed sample receiving chamber in one end thereof and coaxial cable attachment means at the opposite end thereof, a high frequency winding positioned over said sample chamber, and means affixed to said body portion for symmetrically supporting a Helmholtz coil in the region of said sample chamber and high frequency winding.

4. A test probe for association with a nuclear resonance magnetometer having an adjustable high frequency oscillator comprising, a substantially cylindrical non-magnetic body portion, a chamber formed in one end thereof and containing a matter specimen of predetermined gyromagnetic characteristics, a high frequency tank coil for said magnetometer oscillator disposed on said body portion and closely coupled electromagnetically with said matter specimen, a coaxial cable for coupling said coil to said magnetometer oscillator, an axial passage in said body portion opposite said chamber adapted to receive the inner conductor of said coaxial cable, and means on said body portion over said axial bore for securely receiving the outer conductor of said coaxial cable.

5. A test probe for association with a nuclear resonance magnetometer having an adjustable high frequency oscillator comprising, a substantially cylindrical non-magnetic body portion, a chamber formed in one end thereof and containing a matter specimen of predetermined gyromagnetic characteristics, a high frequency tank coil for said magnetometer oscillator disposed on said body portion and closely coupled electromagnetically with said matter specimen, a coaxial cable for coupling said coil to said magnetometer oscillator, an axial bore in said body portion opposite said chamber adapted to receive the inner conductor of said coaxial cable, means on said body portion over said axial bore for securely receiving the outer conductor of said coaxial cable, a non-magnetic probe head affixed to said body portion, and a Helmholtz coil disposed on said probe head symmetrically with respect to said high frequency tank coil.

6. A test probe for association with a nuclear resonance magnetometer having an adjustable high frequency oscillator comprising, a substantially cylindrical non-magnetic body portion having an axial thin-walled chamber formed in one end thereof containing a specimen of matter of predetermined gyromagnetic characteristics, a high frequency tank coil adapted for connection to said magnetometer oscillator disposed on said body portion and closely coupled electromagnetically with said specimen, a coaxial cable having inner and outer concentric conductors for linking said coil to said magnetometer oscillator, an axial bore in said body portion opposite said specimen chamber adapted to receive the inner conductor of said coaxial cable, a passage extending from the inner end of said axial bore permitting conductive attachment of an end of said coil to said inner conductor, an annular groove in said body portion in the region of said axial bore adapted to receive the end of said coaxial cable outer conductor, and a longitudinal passage permitting the conductive attachment of the other end of said coil to said outer conductor.

7. Apparatus as in claim 6 and including a substantially cylindrical non-magnetic probe head having a Helmholtz coil wound thereon and formed with a transverse cylindrical opening extending into said probe head adapted to receive said cylindrical probe body, whereby said Helmholtz coil symmetrically encloses the region of said high frequency tank coil.

8. Apparatus as in claim 7 and including an electrostatic shield wholly enclosing the high frequency portion of said probe body and conductively joined to said coaxial cable outer conductor.

9. In a test probe for association with a nuclear resonance magnetometer, a substantially cylindrical non-magnetic body portion having ends of reduced diameter, a capped axial chamber formed in one end thereof, a relatively fine sealable passage communicating with said chamber and facilitating the introduction thereto of a specimen of predetermined gyromagnetic characteristics, said body portion being formed with an axial bore in the reduced diameter end opposite said specimen chamber adapted to receive an electrical conductor, and a passage extending from said axial bore and communicating with the region of said body portion enclosing said specimen chamber, and an annular protrusion over said axial bore for facilitating attachment thereat of a flexible hollow cylindrical conductor.

10. In a test probe for association with a nuclear resonance magnetometer, a non-magnetic body member having a substantially cylindrical central portion and substantially cylindrical ends of reduced diameter, the first of said cylindrical ends being formed with a comparatively thin-walled axial chamber, a sealable passage extending from the inner end of said chamber to the outer surface of said central portion, a non-magnetic cap having an outer diameter substantially equal to that of said central portion hermetically sealing the outer end of said chamber, an axial opening in the second of said cylindrical ends for axially positioning an electrical conductor in said body member, a channel extending from the inner end of said axial opening to the outer surface of said first end, and an annular protrusion over said axial opening for facilitating the attachment to said body member of a flexible conductive sheath.

11. Apparatus as in claim 10 and including a relatively small cavity extending into said body member from said chamber and providing means for entrapping a predetermined small quantity of air when introducing liquid to said chamber through said sealable passage.

12. A test probe for association with a nuclear resonance magnetometer having an adjustable high frequency oscillator comprising, a substantially cylindrical non-magnetic body formed at one end thereof with a relatively thin-walled chamber containing a liquid matter specimen of predetermined gyromagnetic properties, a high frequency tank coil for said magnetometer oscillator disposed on the wall of said chamber and closely coupled electromagnetically with said liquid specimen, means at the other end of said body for affixing thereto the inner and outer conductors of a coaxial cable, the ends of said high frequency coil being connected to said coaxial cable conductors, a substantially cylindrical non-magnetic head affixed to said body member so that the axes thereof are mutually perpendicular and intersecting, a Helmholtz coil on said head and arranged to substantially symmetrically enclose said high frequency coil, shielded conductors lying adjacent said coaxial cable for coupling said Helmholtz coil to said magnetometer, and an electrostatic shield wholly enclosing the high frequency portion of said body and conductively joined to said coaxial cable outer conductor.

13. A test probe for association with a nuclear resonance magnetometer having an adjustable high frequency oscillator comprising, a substantially cylindrical non-magnetic body portion having an axial thin-walled chamber formed in one end thereof containing a specimen of matter of predetermined gyromagnetic characteristics, a high frequency tank coil adapted for connection to said magnetometer oscillator disposed on said body portion and closely coupled electromagnetically with said specimen, a coaxial cable having inner and outer concentric conductors for use in linking said coil to said magnetometer oscillator, said coaxial cable conductors being axially attached to said body portion at the end opposite said specimen chamber, and conductive means joining said inner and outer concentric conductors to the ends of said high frequency tank coil.

14. Apparatus as in claim 13 and including a substantially cylindrical non-magnetic probe head having a Helmholtz coil wound thereon and formed with a transverse cylindrical opening extending into said probe head and adapted to receive the end of sadi cylindrical probe body containing said specimen of matter and said high frequency tank coil, whereby said Helmholtz coil symmetrically encloses the region of said high frequency tank coil.

15. Apparatus as in claim 14 and including a pair of conductors attached to said coaxial cable and connected to the ends of said Helmholtz coil.

16. Apparatus as in claim 14 and including an electrostatic shield wholly enclosing said probe body and conductively joined to said coaxial cable outer conductor.

17. Magnetic testing apparatus comprising, a non-magnetic member containing an aqueous solution of lithium chloride and exhibiting relatively pronounced gyromagnetic properties, a high frequency coil electromagnetically associated with said solution, a coaxial cable joined to said non-magnetic member and having conductors connected to the ends of said high frequency coil, electromagnetic means for establishing when energized a relatively low frequency alternating weak magnetic field uniformly throughout the region occupied by said solution and said high frequency coil, and a conductive shield wholly enclosing said high frequency coil and said solution and conductively connected to the outer conductor of said coaxial cable.

References Cited in the file of this patent

UNITED STATES PATENTS 2,561,489     Bloch et al. _____ July 24, 1951

OTHER REFERENCES

Reviews of Modern Physics, July 1946, page 350, article by Kellogg.